May 31, 1960 W. C. RUDD 2,938,993
HIGH FREQUENCY ELECTRICAL WELDING
Filed Aug. 29, 1957 3 Sheets-Sheet 1
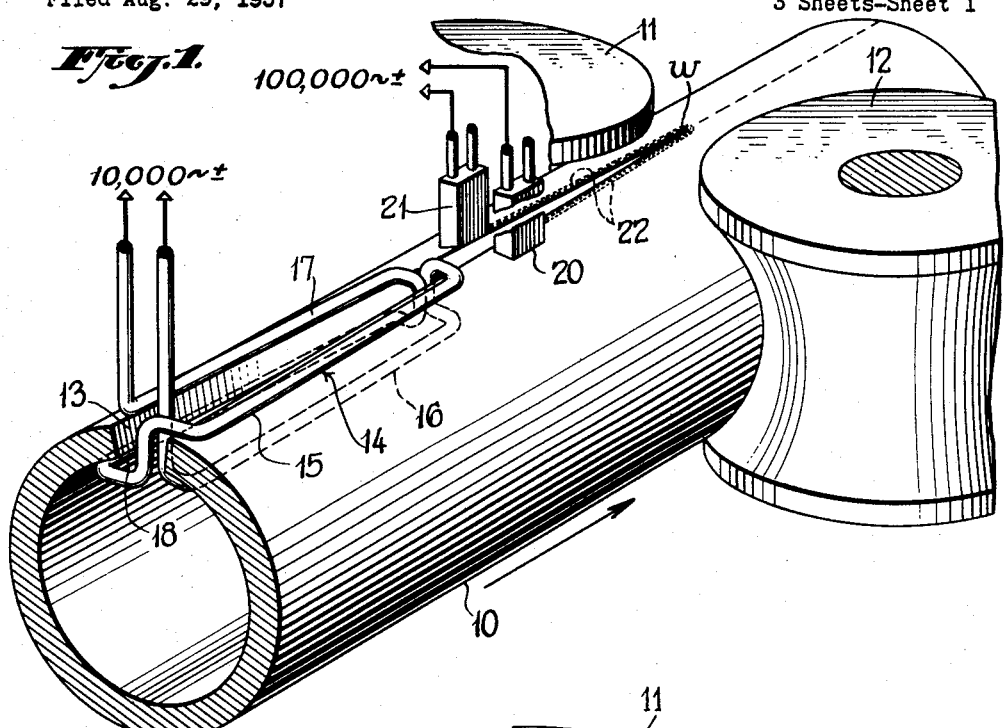
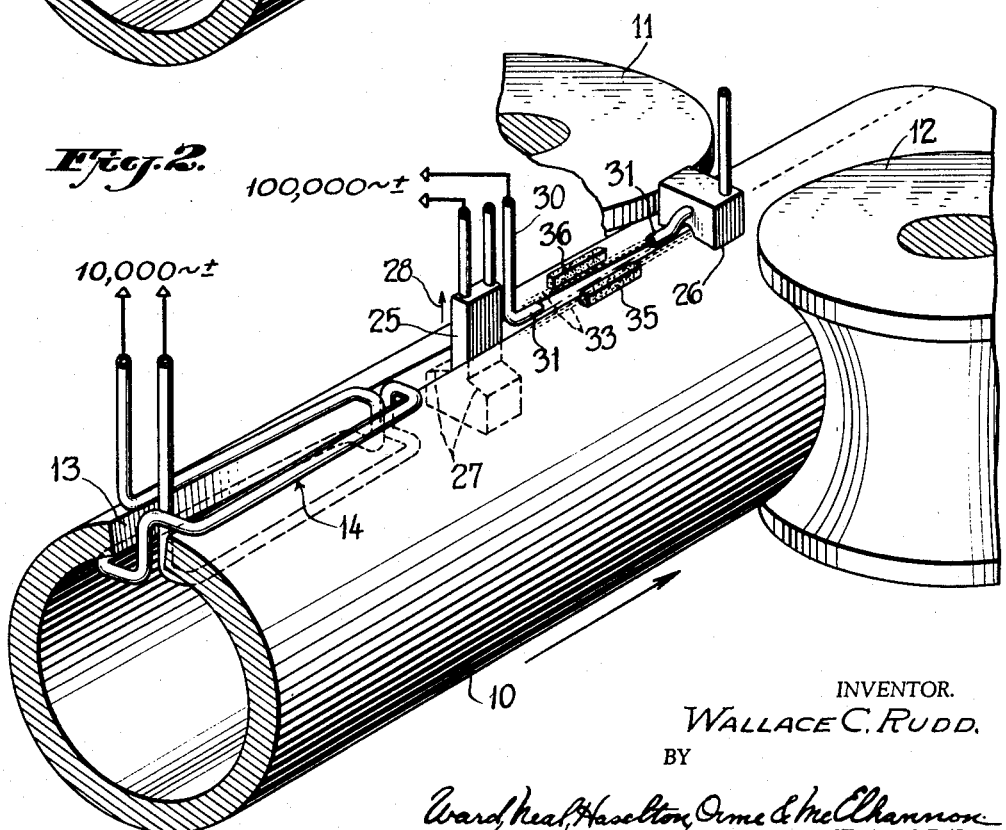
INVENTOR.
WALLACE C. RUDD.
BY
Ward, Neal, Haselton, Orme & McElhannon
ATTORNEYS.

May 31, 1960 W. C. RUDD 2,938,993
HIGH FREQUENCY ELECTRICAL WELDING
Filed Aug. 29, 1957 3 Sheets-Sheet 2
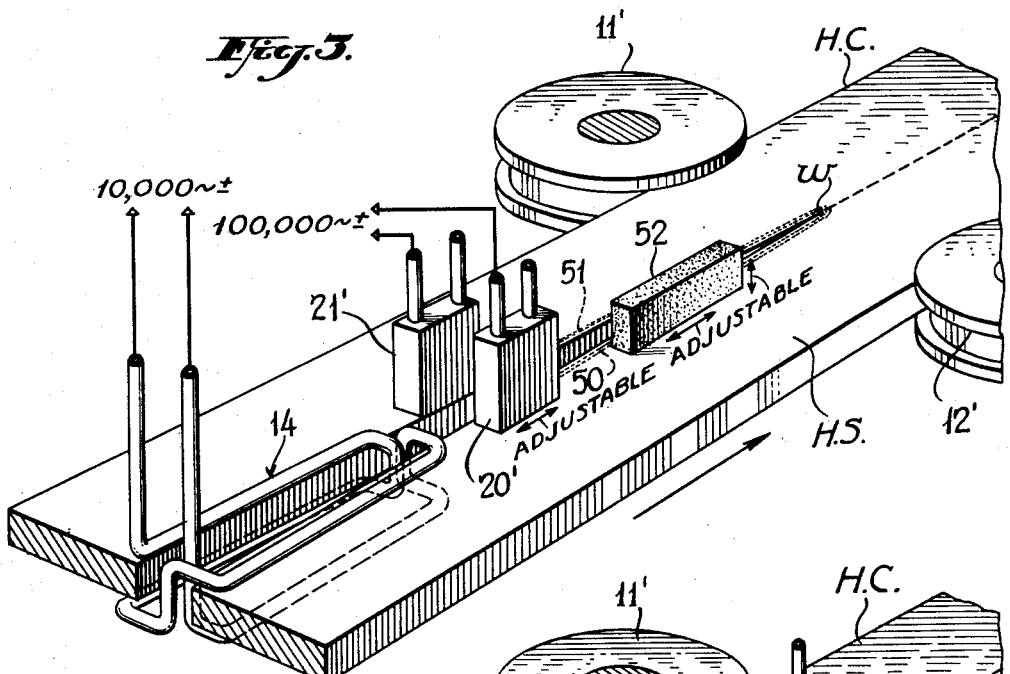
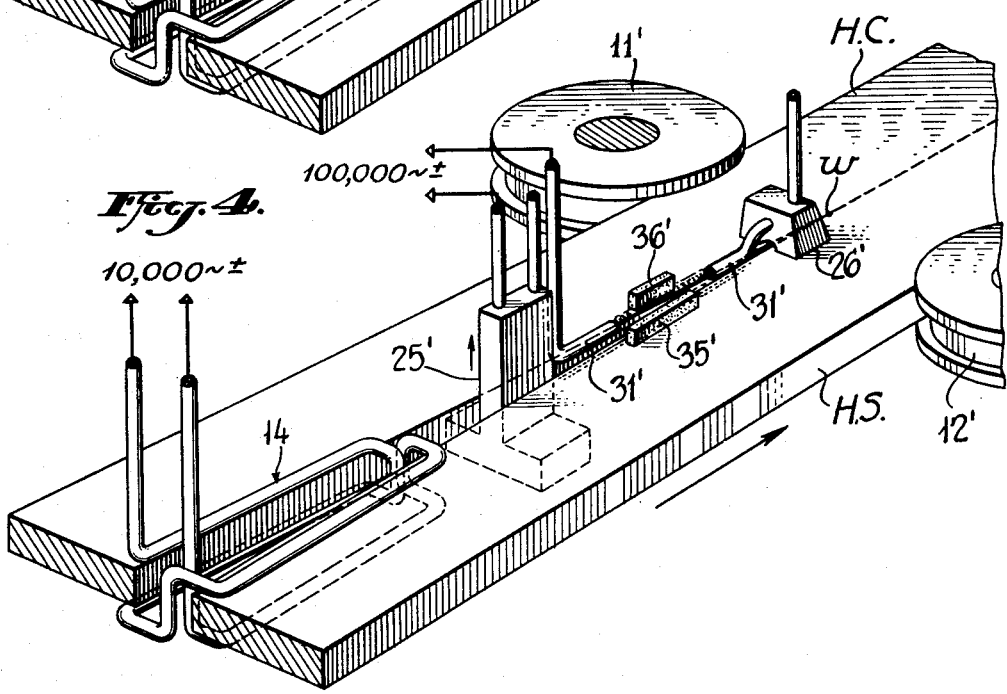
INVENTOR.
WALLACE C. RUDD.
BY
Ward, Neal, Haselton, Orme & McElhannon
ATTORNEYS.

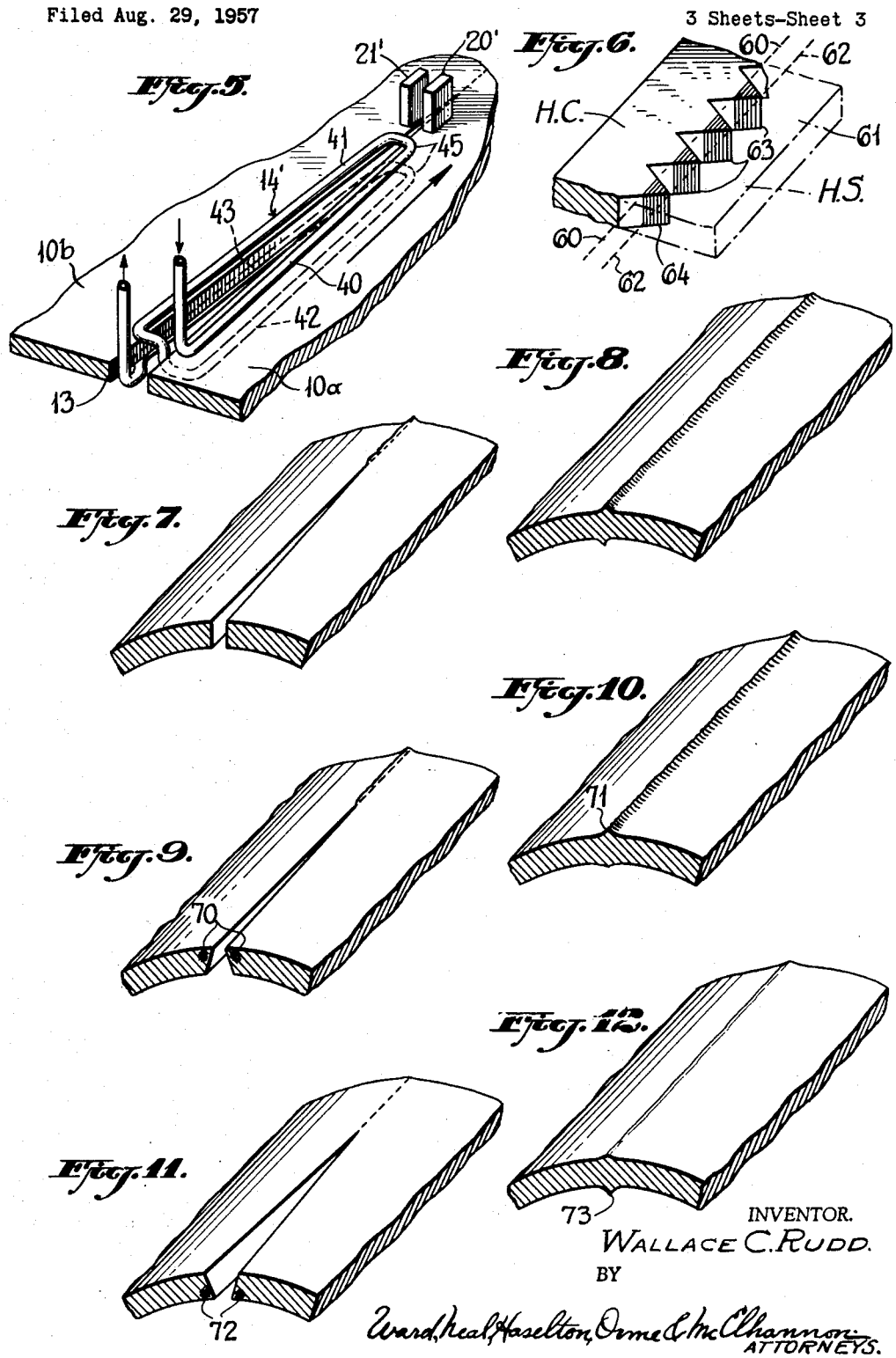

United States Patent Office 2,938,993
Patented May 31, 1960

2,938,993

HIGH FREQUENCY ELECTRICAL WELDING

Wallace C. Rudd, Larchmont, N.Y., assignor to Magnetic Heating Corp., New Rochelle, N.Y., a corporation of New York Filed Aug. 29, 1957, Ser. No. 680,941

11 Claims. (Cl. 219—67)

This invention relates to methods and apparatus for welding metal tubes, strips and the like by the use of high frequency electrical current.

There has heretofore been developed a method for welding together the edges of a longitudinal gap in metal tubing by continuously advancing the tubing past a weld point where the gap edges are pressed together, and by applying to the edges of the gap, shortly in advance of the weld point, contacts connected to a source of radio frequency current which flows from the contacts to and from the weld point, whereby the approaching edge surfaces are heated to welding temperature upon reaching said point. Such method is disclosed for example in applicant's assignee's British Patent No. 772,279, and under appropriate conditions, tubing may be welded thereby at rates from 100, up to several hundred feet per minute. By this method, the gap edges may be heated to welding temperature only for an instant and only to a depth less than a thousandth of an inch, and accordingly the metal at greater depths remains rigid, enabling the meeting edges to be pressed firmly together to secure a high quality weld, free of any detectable differences in the crystalline structure at the weld as compared with the other points in the metal.

However, in case it is desired to weld tubing or strips of relatively thick metal, there has remained the problem of applying sufficient heating current at radio frequencies to heat the approaching gap edges up to welding temperature rapidly enough to weld at the high speeds above noted. This is because, although the radio frequency current may be closely confined on the edge surfaces to be heated, yet a considerable portion of the resulting heat becomes dissipated in the adjacent cold thick metal portions.

According to the present invention in one of its aspects, this problem is overcome by preheating the approaching tube gap edges or strip edges by a method and means which will heat the edges to a rather substantial depth (without heating the very edge surfaces to welding temperature) thereby to establish in effect heating "sumps" along adjacent the edges at a moment just in advance of the radio frequency resistance heating thereof. Thus as the radio frequency is applied to heat the approaching edges to welding temperature and the depth of a thin film, this heat sump effect will prevent dissipation and loss of heat from the high temperature edges, but without danger of softening any of the metal except at the very edge surfaces which are to be welded.

In accordance with a preferred form of the invention, this preheating is accomplished by induction heating, for example by the use of an induction heating "coil" of the type disclosed in U.S. Patent No. 2,763,756, granted to Wallace C. Rudd and Robert J. Stanton, on September 18, 1956, such coil being located in the gap just in advance of the contacts for the radio frequency resistance heating. Such a coil makes possible quite efficient induction heating, but such heating will extend to a greater depth away from the edges than is the case with the above-described method of radio frequency conductive heating. Thus such an induction heating coil is particularly well adapted for creating the heat sump effects above referred to. While the preheating might be accomplished by providing a supplemental or more extended zone of radio frequency conductive heating, yet for that type of heating, at frequencies of the order of 100,000 cycles per second or higher is desirable and any supplemental generating equipment for such frequencies would be much more expensive than required for preheating by induction heating with a coil as above referred to, where the frequency need only be of the order of 10,000 cycles for efficiency. As a consequence, by using the induction heating method for preheating just in advance of the radio frequency conduction heating step, one may, speaking generally, about triple the speed of welding of thick metal parts by using only about twice as much total power as required for the radio frequency conductive heating step alone.

According to a further aspect of the invention certain improved method steps are provided whereby the upsetting of the metal along the welded seam may be so controlled as to occur largely either on the outside surface of the tubing or on the inside, if preferred, or on either the upper or lower surfaces in a case where strips are being welded. According to a still further aspect of the invention, a method is provided for utilizing the welding methods disclosed in such manner as to make possible the formation of implements in the nature of saw blades, the teeth of which may be formed of one form of hardened alloy each welded individually and securely to the main part of the blade which may comprise a strip of high strength more ductile metal.

Further objects and features, particularly with respect to the welding of strips for various purposes among other improvements, will appear from the detailed description below, taken in conjunction with the accompanying drawings which form a part of this specification and illustrate by way of example the presently preferred embodiments of the invention.

In the drawings:

Figs. 1 and 2 are perspective views of two alternative embodiments of apparatus for practicing the invention in the welding of tubing;

Figs. 3 and 4 are similar views but showing the application of the invention to the welding of strips;

Fig. 5 is a perspective view showing an alternative embodiment of the induction preheating coil which may be used with any of the embodiments of Figs. 1–4 inclusive;

Fig. 6 is a perspective view indicating the manner in which, for example, strips of high carbon steel and high speed steel, upon being welded together in accordance with the invention, may be utilized in the formation of saw blades; and Figs. 7–12 inclusive are perspective views illustrating the methods by which the upsetting of the metal along the welded seam may be controlled in accordance with the invention.

Referring now to the drawings in further detail, in Fig. 1, metal tubing as at 10, having relatively thick walls, is shown as being advanced in the direction indicated by the arrow along between a pair of pressure-applying rollers 11 and 12, which cause the opposed edges along a V-shaped gap 13 in the tubing to be pressed together at a weld point w. An induction heating coil of the type disclosed and claimed in the above-mentionel U.S. patent is shown at 14. This form of coil comprises in effect two conductor turns cooled in the conventional way as by an internal stream of cooling fluid and having its terminals connected to a source of high frequency current, the frequency being in the range economically adapted for induction heating purposes, for example a frequency of the order of about 10,000 cycles. However, it will be understood that this frequency might vary down to several thousand, for example, or be somewhat above 10,000. One of the two turns of the coil is in effect folded over one of the edges along the V-shaped gap, so that one elongated portion of this turn as at 15 will extend along above or close to the adjacent gap edge and another elongated portion as at 16 will extend along just below the gap edge. The other turn is similarly in effect folded over the other edge of the gap, so that its elongated portions 17 and 18 extend just above and below the adjacent gap edge of the tube.

An induction heating coil of this type may be readily so made and supplied with sufficient power to heat the tube gap edges up to a temperature for example of 1000° F. (if the tube metal is steel) while the tubing is being advanced at a rate of several hundred feet per minute, thus establishing the heat sump effect above referred to. Although the zone of heating with this type of coil will be efficiently confined to the regions along rather close to the gap edges, yet the edges will be heated to such a temperature and to a depth greater than would be obtained by the high frequency resistance heating method. Shortly following the position of the coil 14, contacts as at 20, 21 are applied respectively at or adjacent the opposed edges of the tube gap and these are connected to a source of radio frequency current, having a frequency in the order of about 100,000 cycles, but preferably considerably higher, up to 300,000 to 450,000 cycles. These contacts should be fluid-cooled in the conventional way, as indicated by the conduit means connected thereto. This high frequency current is thus provided a path of lowest inductance between the two contacts, which extends along the very edge surfaces of the V-shaped gap to and from the weld point, as indicated by the dotted lines 22. In this way, by resistance high frequency heating, the edge surafces to a depth only of a thin film, are for an instant brought up to welding temperature at the weld point, for example in the neighborhood of 2700° F. in the case of steel tubing. And this exceedingly concentrated heating may be carried out at exceedingly high speeds and with great efficiency, since the heat will be prevented from being quickly dissipated away from the gap edges by reason of the fact that the metal has been already preheated to some depth by the induction heating coil 14.

Since the source of power for the induction heating coil need have a frequency of only 10,000 cycles or less, for a given power supply, the generator will cost, generally speaking, less than one-half the cost of the generator for frequencies of the 100,000 cycle order or higher. Thus the preheating step is efficiently accomplished by induction heating, and that method is ideal for preheating along a concentrated zone, but to some substantial depth, whereas the final higher frequency resistance heating step is ideal for its purpose of finally bringing a film only on the edge surfaces up to the welding temperature.

The arrangement shown in Fig. 2 is similar to that shown in Fig. 1, except that the higher frequency resistance heating is accomplished by placing contacts "in line" as at 25, 26, instead of at opposite sides of the gap. Contact 25, for example, may extend down in spaced relation to the gap edges and into the tubing and be formed internally of the tubing with flange portions as at 27, which engage the inside surface of the tube metal at each side of the gap, and if desired, this contact may be suitably resiliently supported so as to apply an upward pressure in the direction indicated by the arrow 28, whereby the flanges 27 will press slightly upwardly against the inner surface of the tube metal. The contact 26 may be mounted to bridge the weld point w or at some point fairly closely adjacent to the weld point. Both contacts as indicated may be provided with cooling fluid connections and the terminals of the higher frequency power source are connected respectively to contact 25 and to a fluid-cooled connection portion 30 which extends as at 31 along just above the tube gap and to the contact 26. Thus paths of current flow are provided as indicated at 33 along the opposite sides of the tube gap and the connection portion 31, located just above these paths, will cause the lowest impedance paths in the tube metal to occur closely adjacent the gap edges. The gap may in fact be closed for a considerable distance in advance of of the weld point, if desired. But it should be noted that with this "in-line" arrangement of contacts, the currents on opposite sides of the seam line at any moment will be running in the same direction and thus tend to repel each other from such line, whereas in Fig. 1, at any moment the currents in paths 22 run in opposite directions, thus tending to attract each other. In view of these circumstances, with the "in-line" arrangement of contacts as of Fig. 2, it is desirable to provide blocks of magnetic material as at 35, 36 located in positions somewhat spaced apart respectively from the seam line or gap edges and just above the tube metal. This will have the effect of increasing the inductance of the current paths along lines spaced from the edges and thereby cooperating with the effect of the connection 31 to force the high frequency current paths 33 closer to the gap edge surfaces or seam line.

Since the blocks of magnetic material 35, 36 will be in the presence of quite high frequency magnetic fields, they should be formed of material which will not permit any substantial eddy current effects to be induced therein, and may be formed for example of sintered magnetic oxide insulation material, preferably of known types, which have a low loss factor and high volume resistivity, for example such as the material marketed under the name Ferramic by General Ceramic & Steatite Corp. Other material, such as finely divided magnetic material embedded in insulation, may be used. The material used should have a permeability (mu) greater than one, preferably substantially greater.

If the tube metal is relatively thick and the "in-line" method of applying the higher frequencies is used, as shown in Fig. 2, there would be a tendency for the high frequency current in the paths 33 to flow more along the upper or outer edge surfaces at the gap, instead of penetrating to the full depth of the gap edges. But this effect is overcome by arranging the contact 25 so that it will engage the under surfaces at the gap, while the contact 26 is engaging the outer or upper surface.

The alternative form of induction heating coil shown at 14' in Fig. 5, also comprises two turns, that is, an upper turn having elongated side portions as at 40, 41 extending along opposite sides of the gap and an inner or under turn having elongated side portions as at 42, 43 extending along respectively at opposite sides of the gap interiorly of the tube (or along undersurfaces of strips as at 10a, 10b, in case strips rather than tubing are being welded). While the induction heating coil of the form shown in Fig. 5 may in some circumstances be somewhat less efficient for the purpose than that shown in Figs. 1-4, yet the form of Fig. 5 has the advantage that at the ends of the turns nearest the weld point, and as indicated at 45, it is unnecessary to have any connective portions of the turns extend into the gap, and thus the gap may be made narrower, as is often desirable, just in advance of the higher frequency resistance heating contacts shown at 20', 21'.

The arrangements of Figs. 3 and 4 respectively are similar to those of Figs. 1 and 2, except that two strips with a V-shaped gap in advance of the weld point are being welded together edge to edge, instead of welding opposed edges of a tube gap. These arrangements, for example, are desirable for use in cases where a high carbon steel strip as at H.C., is to be welded to a high speed steel strip as at H.S. The strips are continuously advanced in the direction indicated by the arrows by the use of suitable roller means, including pressure-applying rollers as at 11', 12', which press the strip edges together as they pass the weld point w. (With the arrangement of Fig. 4, the gap edges may be brought together considerably in advance of the weld point, if desired.)

Where the strips are formed of metals of different kinds, character or dimensions, it will be desirable to heat one of the edges along the V-shaped gap to a higher temperature or with a slightly more or less prolonged or concentrated application of heat. This may be accomplished by either one of two ways, or by the combination thereof. First, one or both of the contacts as at 20', 21', of Fig. 3 may be made adjustable, as indicated, in directions longitudinally of the welded seam, by the use of suitable simple supporting bracket means. This will permit one or the other of current paths 50 or 51 along opposite sides of the gap, to be made longer than the other to provide a longer period of heating in advance of the weld point. Secondly and preferably, a block or blocks of suitable magnetic material, such as above described, and as indicated at 52 may be suitably mounted along one or another of the current paths 50 or 51, to increase the inductance of such path along lines spaced slightly away from the gap edge, thereby acting to cause the current to be concentrated closer to the very edge surfaces of the gap, resulting in faster or higher-temperature heating of the particular gap edge adjacent which the block 52 is mounted. The block 52, as indicated in Fig. 3, may be adjustable by suitable supporting bracket means in vertical directions to vary its spacing from the strip surface and thereby varying the intensity of its effect toward concentrating the current at the gap edge. The block may also, as indicated by arrows, be adjustable longitudinally.

Because of close space limitations or otherwise, it will sometimes be desirable to position one of the contacts 20', 21' closer than the other to the weld point, in which event the current path from the closest contact would tend to cause heating of its corresponding gap edge to a lesser degree than the other gap edge. But this difference, if desired, may be compensated for by applying one of the blocks of magnetic material 52 adjacent the shorter current path and thereby still obtaining equal heating of both gap edges, or even a greater heating effect as is usually desired on the high-speed steel strip.

With the arrangement shown in Fig. 3, comprising the "in-line" positioning of the electrodes, the blocks of magnetic material 35' and 36' may be made of different sizes or lengths, as indicated, in the event greater heating is desired on one strip edge than on the other. For example, as shown, the block 35' is the longer, so as to cause more intense and extended concentrated heating along the edge of the high speed steel strip. The blocks of magnetic material of Figs. 2 and 4 may, of course, be adjusted in position, as in the case of the block 32 in Fig. 3, to meet various conditions.

The method of welding the strips H.C. and H.S. as per Figs. 3 and 4, makes possible composite strips in a form highly desirable for a variety of uses, for example, the formation of bandsaw blades or the like in the manner indicated in Fig. 6. Here a strip H.S. has been welded to a strip H.C. along a line indicated at 60, the strip H.S. initially extending out to a substantial width as indicated by the dotted lines 61, that is, of a width sufficient for convenient handling in the apparatus. Then a large portion of the strip H.S. may be slit off along the dotted line indicated at 62, that is, along what will eventually be the tips of saw teeth 63. The outer portions of the strip H.S. may then be reused by welding same again to another strip H.C. The saw teeth 63 are cut on the edge of the strip H.C. and each thereof will have a high speed steel tip, as at 64. Thus, while the tips will be of hard steel as desired, the base portions of each tooth and the supporting portions thereof, will be tough high carbon steel, as desired. And since, with the high frequency resistance heating welding methods above described, the welded seam will be free of crystalline disturbances of the metal, each of the hard tips on the teeth will be securely and permanently bonded in place with a weld of high strength. By using the slit-off portions of the strip H.S. by successively welding same to a high carbon strip and then cutting off the excess, it is possible to make economical use of the expensive high speed steel. Alternatively, high carbon steel strips may be welded on either side of a narrow high speed steel strip, and the latter then slit along a median line to provide economically two composite strips for saw blade or other purposes.

In case tubing is to be welded, it will oftentimes be preferable that most of the upset of the metal along the welded seam be made to occur on the exterior of the tube, particularly if the tube is to be used for conducting liquid. In some other cases, it may be preferred to have the upset occur largely on the interior, so as to leave the exterior as nearly uniform in diameter as possible. Also, in the case of the welding of strips, it may be preferred sometimes to have the upset on the upper surface, and in other instances largely on the lower surface. By the present invention, utilizing resistance heating at frequencies of the order of about 100,000 cycles or higher, it is easily possible, by suitably shaping the gap edges, to control the direction of the upset. For example, if the edge surfaces are cut so as to come together in parallel relationship as indicated in Fig. 7, then there will be some upset along the welded seam in both directions: that is, inwardly and outwardly of the tubing, if tubing is being welded, as indicated in Fig. 8; or upwardly and downwardly in the case of strip welding. On the other hand, if one or both of the approaching edges is inclined or bevelled with respect to the other, as indicated in Fig. 9, and in a direction such that the upper portions of the edge surfaces are closest to each other, then if high frequency welding methods, particularly those disclosed in Figs. 1 and 3, are used, the currents in the opposed gap edges will tend to be more concentrated where the edge portions are closest, as indicated by the cross-hatched areas 70 in Fig. 9. This will cause such closest edge portions to be heated to higher welding temperatures than the somewhat more remote opposed edge portions, with the result that the upset will occur upwardly, as indicated at 71 in Fig. 10, and on the exterior in case tubing is being welded, and on the upper surface in the case of strip welding. Similarly, as shown in Fig. 11, if one or both of the edges are bevelled downwardly and toward each other, greater current concentrations will occur at the cross-hatched portions indicated at 72, with the result that the upset will occur mostly downwardly, as indicated at 73 in Fig. 12. The degree of bevelling of the edges, as shown in Figs. 9 and 11, is for clearness shown somewhat exaggerated for the usual case, as it will be understood that the bevelling should not ordinarily be so severe but what the entire abutting edge surfaces will be heated to welding temperature, even though the closest opposed edge surfaces are heated to a higher degree to obtain the directional upsetting effects desired.

Due to the different ways in which the high frequency heating is applied in the final heating zone and in the preheating zone respectively (by conductive and inductive application) and due to the different nature of the resulting heating, viz. final concentrated heating of only a film on the surfaces to welding temperature, but preheating to some depth, the two types of heating complement each other with such efficiency as to make possible, generally speaking, a three-fold increase in the speed of welding, merely by adding a preheating generator and coil at an expense which will generally be less than half that of the final zone heating equipment. This aspect of the invention has the further advantage of lending an improved stabilizing effect in the sense that the final welding temperature may be made more uniform and the position of the weld point may be kept more nearly constant. This arises from the fact that any percentage variations in the final heating will represent percentages of the temperature change in the final zone, rather than of a larger total temperature change in the two zones. It should be noted that the temperatures above given as to the degree of heating in the two zones, are merely illustrative and may be varied depending upon the dimensions and character of the metal being welded. It should also be noted that the induction coil of the type shown in Figs. 1–4 makes possible very uniform heating, relatively free of any variations due to differences in coupling between the coil and the edges being heated. That is, if one of the edges for example moves upwardly slightly from its desired predetermined path, while this would bring it into closer coupled relation with the upper portions of the coil, yet this will be compensated for by reason of the fact that the edge will be more loosely coupled with the lower portions of the coil. Accordingly, the induction heating coil may be used efficiently and uniformly to raise the temperature of the edges a considerable way toward the final welding temperature, without danger of introducing substantial variations in the degree of heating. Also, since two quite different types of heating are used in the two zones, the effect of any irregularities in the heating at either zone will be minimized.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding a longitudinal edge of one metal portion to the longitudinal edge of another metal portion, which comprises: rapidly advancing said portions and bringing the edges thereof into contact under pressure at least by the time they reach a predetermined weld point; maintaining along on the edges at a final heating zone and shortly in advance of the weld point, heating current of a frequency of the order of 100,000 cycles per second or higher, said current being conductively applied and being concentrated on the edge surfaces and being sufficient to bring said surfaces to welding temperature at the weld point; and preheating the regions close to said edges in advance of said final heating zone to a temperature lower than welding temperature by inducing heating currents therein of a frequency of the order of about 10,000 cycles or less to provide heat sumps along in said regions and acting to check dissipation of heat from the edge surfaces in the final heating zone.

2. Method for welding a longitudinal edge of one metal portion to the longitudinal edge of another metal portion, which comprises: rapidly advancing said portions and bringing the edges thereof into contact under pressure at least by the time they reach a predetermined weld point; maintaining along on the edges at a final heating zone and shortly in advance of the weld point, heating current of a frequency of the order of 100,000 cycles per second or higher, said current being conductively applied and being concentrated on the edge surfaces and being sufficient to bring said surfaces to welding temperature at the weld point; and preheating to substantial depth the regions close to said edges in advance of said final heating zone and to a temperature substantially lower than welding temperature, by inducing heating currents therein to provide heat sumps along in said regions and acting to check dissipation of heat from the edge surfaces in the final heating zone.

3. Method in accordance with claim 2 and in which the heating current in the final heating zone is applied by contacts engaging said edges respectively at opposite sides of the gap therebetween shortly in advance of the weld point to provide a current path from said contacts along said edges to and from the weld point.

4. Method in accordance with the foregoing claim 2 and in which the heating current in the final heating zone is applied to said edges by two contacts, one of which engages the metal portions at or adjacent the weld point, and the other of which engages both of the edges shortly in advance of the weld point and the current being concentrated along said edges between the two contacts by reducing the inductance along said edges by maintaining a lead connection to one of said contacts in a position extending along in closely spaced relation to said edges, and the current being further concentrated on said edges by increasing the inductance of current paths spaced from said edges by bringing high volume resistivity magnetic material into the proximity of said paths.

5. Method for welding a longitudinal edge of one metal portion to the longitudinal edge of another metal portion, which comprises: rapidly advancing said portions and bringing edges thereof into contact under pressure at least by the time they reach a predetermined weld point; maintaining along said edges shortly in advance of said weld point heating currents of a frequency of the order of 100,000 cycles per second or higher by applying contacts connected to a source of such current respectively to said edges at opposite sides of a gap therebetween in advance of said weld point; maintaining one of said contacts further from the weld point than the other; and increasing the concentration of the resulting heating current on one of the edge surfaces as compared with that on the other by maintaining a mass of high volume resistivity magnetic material along in a position spaced from said one edge to increase the inductance of the current paths spaced therefrom.

6. Method for welding a longitudinal edge of one metal portion to the longitudinal edge of another metal portion and controlling the direction of upset of the metal along the welded seam, which comprises: bevelling the edge surface of at least one of said edges with respect to the edge surface of the other; advancing said portions with a gap between their opposed edges but bringing such edges into contact under pressure at least by the time they reach a predetermined weld point, a portion along one of said edges and adjacent which the upset is desired largely to occur being, because of said bevelling, spaced with a narrower gap than other portions of the same edge, from the opposed edge; and conductively applying to points on the edge surfaces respectively shortly in advance of the weld point heating current which flows from such points to and from the weld point and is of a frequency of the order of 100,000 cycles per second or higher and of sufficient strength to heat the edge surfaces to welding temperature upon reaching the weld point, the current due to its high frequency being substantially more concentrated on the approaching opposed edge surface portions which are closest, thus heating such closest edge portions to a higher welding temperature than the opposed edge surface portions which are more widely spaced, thereby resulting in greater upsetting of the metal adjacent such closest portions when pressed together, than adjacent the more widely spaced portions.

7. Method for welding a longitudinal edge of one metal portion to the longitudinal edge of another metal portion each such portion being of the same metal throughout its thickness, and for controlling the direction of upset of the metal along the welded seam, which method comprises: bevelling the edge surface of at least one of said edges with respect to the edge surface of the other; advancing said portions with a gap between their opposed edges but bringing such edges into contact under pressure at least by the time they reach a predetermined weld point, a portion along one of said edges and adjacent which the upset is desired largely to occur being, because of said bevelling, spaced with a narrower gap than other portions of the same edge, from the opposed edge; and establishing on the edge surfaces shortly in advance of the weld point high frequency heating current which is more concentrated in the opposed edge surface portions which are closest, and thus heating such closest edge portions to a welding temperature higher than the opposed edge surface portions which are more widely spaced, thereby resulting in greater upsetting of the metal adjacent such closest portions when pressed together, than adjacent the more widely spaced portions.

8. Method for welding a strip of high carbon steel to a strip of high speed steel, which comprises: rapidly advancing said strips and bringing edges thereof into contact under pressure at least by the time they reach a predetermined weld point; maintaining along said edges shortly in advance of said weld point heating currents of a frequency of the order of 100,000 cycles per second or higher by applying contacts connected to a source of such current respectively to said edges at opposite sides of a gap therebetween in advance of said weld point; maintaining one of said contacts further from the weld point than the other; and increasing the concentration of the heating current on the edge surfaces formed of high speed steel, as compared with the current concentration on the other edge, by maintaining a mass of high volume resistivity magnetic material along in a position spaced from the high speed steel edge to increase the inductance of the current path spaced from said edge.

9. Apparatus for welding a longitudinal edge of one metal portion to the longitudinal edge of another metal portion which comprises: means for rapidly advancing said portions side by side and for bringing the edges thereof into contact under pressure at least by the time they reach a predetermined weld point; a source of heating current of a frequency of the order of 100,000 cycles per second or higher; a first contact located at or adjacent the weld point and a second contact located to contact with edges of both of the metal portions shortly in advance of the weld point; a lead from said source of high frequency heating current extending to one of the contacts along in closely spaced relation to said edges, thereby to concentrate high frequency paths of heating current along on the surfaces of said edges for heating same in a final heating zone to welding temperature at the weld point; masses of high volume resistivity magnetic material located in positions spaced along from said edges and acting further to concentrate the heating current in said edges by increasing the inductance of current paths in the metal spaced from said edges; and means for preheating said edges in advance of said final heating zone, such preheating means comprising a course of heating current of a frequency of the order of 10,000 cycles per second or less and an induction heating coil connected to the terminals of the latter source and located at a position with turn portions which extend along said edges respectively.

10. Apparatus for welding a longitudinal edge of one metal portion to the longitudinal edge of another metal portion, which comprises: means for rapidly advancing said portions side by side and for bringing the edges thereof into contact under pressure at least by the time they reach a predetermined weld point; a source of heating current of a frequency of the order of 100,000 cycles per second or higher; contacts connected to said source respectively and applied to said portions at opposite sides of the gap between said portions shortly in advance of the weld point, said contacts being mounted on means permitting adjustment of same longitudinally of the metal portions and to different distances from said weld point; and a mass of high volume resistivity magnetic material mounted to extend along in spaced relation to one of said metal portions, spaced from the edge thereof and shortly in advance of the weld point, and mounting means being provided for said mass to permit adjustment of its spacing with respect to the adjacent metal portion, said mass acting to increase the inductance of current paths spaced from the edge of the metal portion, thereby acting to concentrate the high frequency current on the edge surface thereof.

11. Method for welding an edge of one metal portion to an edge of another metal portion and for controlling the direction of upset of the metal along the welded seam, which method comprises: beveling the edge surface of at least one of said edges with respect to the edge surface of the other; positioning said metal portions with their said edges extending along each other initially in spaced apart relation; conductively applying to flow along on said edge surfaces current of a high frequency and of sufficient strength to heat the opposed edges to welding temperature; pressing the heated edge portions together and into welded relation; said current being of a frequency sufficiently high whereby said current and the resulting heating effect will be substantially more concentrated along on the beveled portions of the edges which are closest, thus heating such closest edge portions to a higher welding temperature than the opposed edge portions which are more widely spaced, thereby resulting in greater upsetting of the metal adjacent such closest portions when pressed together than adjacent the more widely spaced portions.

References Cited in the file of this patent

UNITED STATES PATENTS

| 1,189,856 | Murray | July 4, 1916 |
| 2,020,276 | Crawford | Nov. 5, 1935 |
| 2,222,579 | Walcott | Nov. 19, 1940 |
| 2,763,756 | Rudd et al. | Sept. 18, 1956 |
| 2,794,108 | Park | May 28, 1957 |
| 2,818,488 | Rudd et al. | Dec. 31, 1957 |

FOREIGN PATENTS

| 716,378 | Great Britain | Oct. 6, 1954 |
| 748,528 | Great Britain | May 2, 1956 |
| 972,849 | France | Sept. 6, 1950 |
| 1,095,095 | France | Dec. 15, 1954 |